No. 878,402. PATENTED FEB. 4, 1908.
C. KRAMER.
MAGNET FOR ALTERNATING CURRENTS.
APPLICATION FILED MAR. 12, 1906.
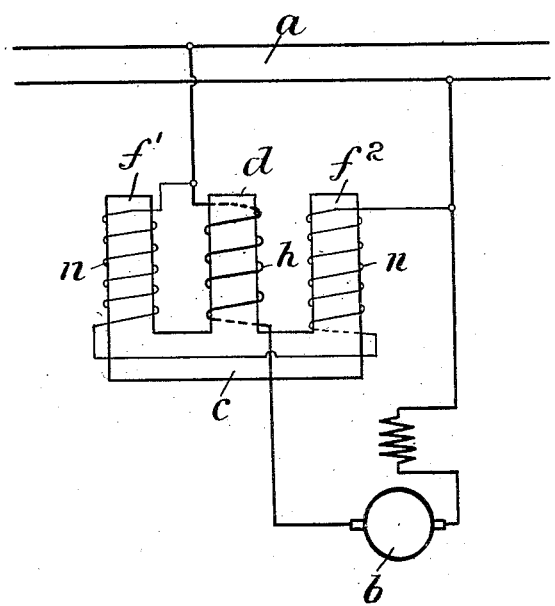

UNITED STATES PATENT OFFICE.

CHRISTIAN KRÄMER, OF FRANKFORT-ON-THE-MAIN, GERMANY, ASSIGNOR TO FELTEN & GUILLEAUME LAHMEYERWERKE ACTIEN-GESELLSCHAFT, OF FRANKFORT-ON-THE-MAIN, GERMANY.

MAGNET FOR ALTERNATING CURRENTS.

No. 878,402.  Specification of Letters Patent.  Patented Feb. 4, 1908.

Application filed March 12, 1906. Serial No. 305,720.

*To all whom it may concern:*

Be it known that I, CHRISTIAN KRÄMER, a subject of the German Emperor, and a resident of Frankfort-on-the-Main, Germany, have invented certain new and useful Improvements in Magnets for Alternating Currents, of which the following is a specification.

The present invention relates to improvements in alternating current magnets and the object of the invention is to provide a magnet of this character which shall be particularly applicable for use with brakes employed in connection with electric hoists, railways, etc.

Single phase alternating current magnets provided with two windings through which currents of different phase are conducted are well known, but the means used for displacing the phase, such as throttling coils, cause a considerable loss of energy.

One of the objects of the present invention is to so construct such a magnet that it is not necessary to have a multiphase feeding system nor to provide a special character of phase in the winding of the magnet itself or in external resistances so that the loss of energy caused by such arrangements as have heretofore been employed will be avoided.

The present invention is illustrated diagrammatically in the accompanying drawing, referring to which $c$ is a single phase alternating current magnet having a coil $h$ wound on the core $d$ and connected in series with a motor $b$ and line $a$. The magnet is also provided with a shunt winding $n$ wound on two other cores $f'$, $f^2$ and connected with the winding $h$ and line, as indicated.

The winding $n$ it will be seen is connected in parallel with the translating apparatus, and the main current winding $h$ lies in a circuit of small phase displacement, while the other winding $n$, owing to its self-induction, is in a circuit of greater phase displacement.

The increased self-induction, resulting from the arrangement of the winding illustrated in the drawing, prevents the starting current from exceeding a predetermined strength and the series current through the winding $h$ presents a considerable phase difference over the current in the shunt, or pressure, winding $n$ so that instead of the magnet having an oscillating field, as do the alternating current magnets commonly employed, a rotating field is produced and the pull or force of the magnet is never reduced to zero. By this arrangement, also, operation of the magnet is noiseless and it is not necessary to create an artificial phase difference in the winding of the magnet or to use an external resistance such, for instance, as is described in German Patent 149,589. The arrangement described in said patent involves a considerable loss of electrical energy which is obviated by the present invention.

An important feature of the present invention is that the main and shunt windings are wound on different poles or portions of the magnet.

Having thus described the invention, what is claimed is:—

1. The combination with a source of single phase-alternating current, of an electro magnet comprising a core consisting of three parallel pole pieces and a yoke connecting the same, and windings upon said pole pieces, the winding upon one of said pole pieces being connected in series across said source with a substantially non-phase-displacing, current-reducing means, the windings upon the other two pole pieces being connected in series across said source.

2. The combination with a source of single phase alternating current, of an electro magnet comprising a core consisting of three parallel pole pieces and a yoke connecting the same, and windings upon said pole pieces, the winding upon one of said pole pieces being connected in series with a motor across said source, the windings upon the other two pole pieces being connected in series across said source.

In testimony whereof I have signed my name to this specification in the presence of two subscribing witnesses.

CHRISTIAN KRÄMER.

Witnesses:
 FRANZ HASSLACHER,
 ERWIN DIPPEL.